J. T. QUIGLEY.
INDEX EQUIPMENT.
APPLICATION FILED SEPT. 3, 1918.

1,314,425.

Patented Aug. 26, 1919.
5 SHEETS—SHEET 2.

J. T. QUIGLEY.
INDEX EQUIPMENT.
APPLICATION FILED SEPT. 3, 1918.

1,314,425.

Patented Aug. 26, 1919.
5 SHEETS—SHEET 3.

Inventor:
John T. Quigley,
by Emery, Booth, Janney & Varney
Attys.

J. T. QUIGLEY.
INDEX EQUIPMENT.
APPLICATION FILED SEPT. 3, 1918.

1,314,425.

Patented Aug. 26, 1919.
5 SHEETS—SHEET 5.

Inventor:
John T. Quigley.
by Emery Booth, Janney & Varney
Attys.

UNITED STATES PATENT OFFICE.

JOHN T. QUIGLEY, OF BOSTON, MASSACHUSETTS, ASSIGNOR TO COSTMETER COMPANY, OF BOSTON, MASSACHUSETTS, A CORPORATION OF MASSACHUSETTS.

INDEX EQUIPMENT.

1,314,425.  Specification of Letters Patent.  Patented Aug. 26, 1919.

Application filed September 3, 1918. Serial No. 252,311.

*To all whom it may concern:*

Be it known that I, JOHN T. QUIGLEY, a citizen of the United States, and a resident of Boston, in the county of Suffolk and State of Massachusetts, have invented an Improvement in Index Equipments, of which the following description, in connection with the accompanying drawings, is a specification, like characters on the drawings representing like parts.

This invention relates to index equipments of the class in which the index elements have their index-bearing margins arranged in overlapping relation, and is more especially concerned with an equipment having novel provision to facilitate rapid reference, enabling one to obtain access to the desired card by a single movement or operation, regardless of the positions of the card-supporting index elements.

My invention will be best understood by reference to the following description, when taken in connection with the accompanying drawings of one specific embodiment thereof, while its scope will be more particularly pointed out in the appended claims.

Referring to the drawings, and to the embodiment of my invention which is illustrated therein, I have shown for purposes of exemplification an index equipment comprising a plurality of overlapping horizontally-pivoted sheet supports herein main leaves 12, whose overlapping marginal portions are provided with two sets of identifications, one set being presented to view when said leaves are in one position, and the other being presented to view when said leaves are in another position. Suitable means are provided to position the leaves in either of two positions, one in which one entire set of identifications is presented to view, and the other in which the other entire set is presented to view. In a third position, part of one set of identifications is presented to view, while the remainder of the other set is presented. Moreover, since both identifications for a given leaf are alike, it follows that, regardless of the position of the leaves, the entire set of main index identifications can be read without shifting any leaf.

Figure 1:
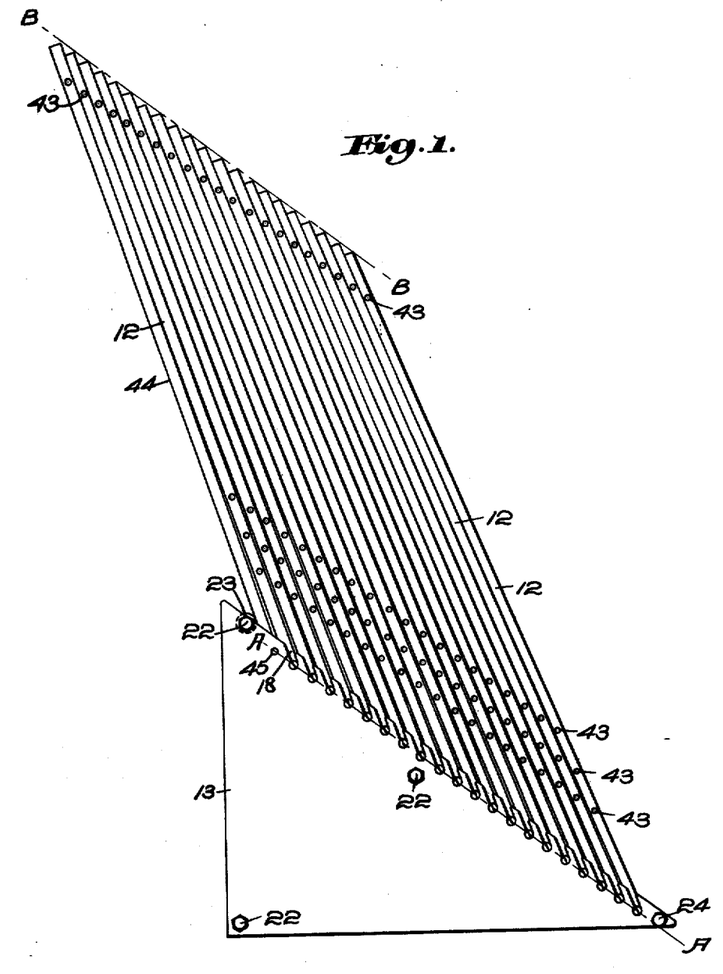
Figure 1 is a side elevation of an index equipment embodying my invention, showing the same as it appears with the main leaves upstanding.
Figure 2:
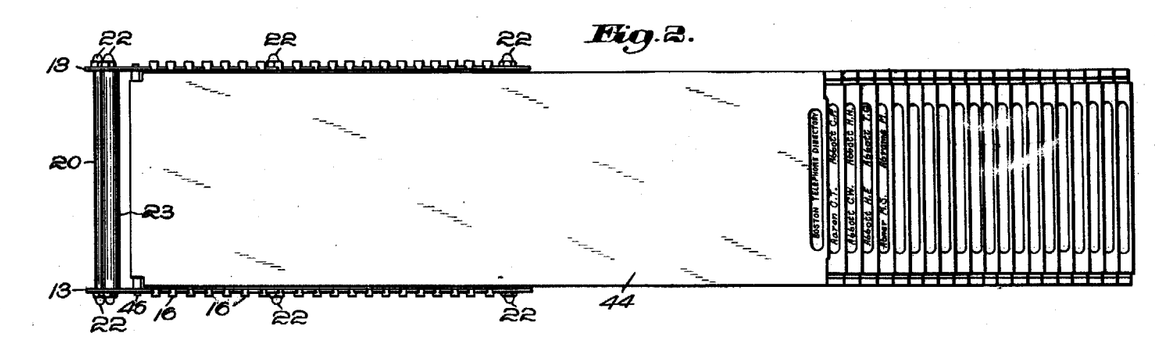
Fig. 2 is plan of the equipment showing the same as it appears with the main leaves prone.

To these ends, herein I have provided a support on which the leaves 12 are pivoted on generally horizontal axes, arranged in an oblique series, and preferably in an inclined plane A—A, generally parallel with the plane B—B of the overlapping edges of the index elements. This is well illustrated in Fig. 1, in which I have shown a support comprising a pair of walls 13, notched to provide bearings 14 to receive suitable pivots which, in the present example, are in the form of horizontal shafts 15, one of which is shown in Fig. 6, having laterally projecting ends 16 forming trunnions. If desired, suitable provision may be made, so that the trunnions may instantly be locked to or unlocked from the support. One convenient way of accomplishing this is to make the trunnions slabbed off, as at 17, to form eccentrically-disposed projections which, in the present example, are semi-cylindrical as viewed from the end thereof (see Figs. 1 and 3). These ends are normally seated in and interlocked against accidental removal from the support by making their seats generally circular in form. In one position of each main leaf (herein generally upright)

the trunnions may be removed from their bearings by providing the latter with relatively narrower entrances 18 (see Figs. 1 and 3), which are disposed eccentrically. Thus, when the eccentric trunnion is in proper registration with the eccentrically disposed entrance, as shown in Fig. 1, the main leaf may be lifted from its bearings and thus detached from its support. The shafts 15 may be held against turning movement with relation to their respective main leaves in any suitable manner, as by rivets 19 extending through both, as shown in Fig. 6.

In the present embodiment, the walls 13 are simply thin, leaf-like flat metal plates, which may have a generally triangular outline. These plates may be secured to each other in a variety of ways, but in the present example, I have provided a plurality of tie-rods 20 having pairs of shoulders 21 serving as means to space the plates a definite distance apart, while nuts 22 threaded onto said rods clamp the plates against said shoulders, as clearly shown in Fig. 6. Suitable means are provided to position the main leaves in either of two positions, one in which they are upstanding and the other in which they are prone. One convenient means comprises two tie-rods 23 and 24, generally similar to the tie-rods 20. Preferably, the tie-rod 23 is so placed as to allow the leaves 12 to incline backward beyond vertical planes containing their axes when they are upstanding, so that when in such position, nothing is needed to prevent them from falling forward.

When the main leaves are upstanding, they are in such position that their index identifications are presented in the best possible position for convenient reading; that is to say, in a generally horizontal line of vision. On the other hand, when they are prone, their upper faces are presented in the best possible position for inspecting the auxiliary leaves or sheets and making records thereon, since the generally horizontal position makes a flat writing surface comparable to a desk. The advantage of this arrangement will be readily appreciated when it is considered that the overlying main leaves or sheet supports may be opened instantly at the desired point, and the record made without removing the auxiliary leaf or sheet from its place, or the main leaves 12 from their mounting.

It has been stated that index identifications are provided on opposite faces of each main leaf, along the overlapping marginal portions. These identifications may be labels of any desired character, each label indicating by words, letters or other symbols, the elements of the data contained in or carried by that particular leaf. It should be understood, of course, that the label on one side is precisely the same as that on the other, and no matter which side is presented to view, the user can tell at a glance without moving any part of the equipment which main leaf contains the desired auxiliary leaf or sheet.

Figure 9:
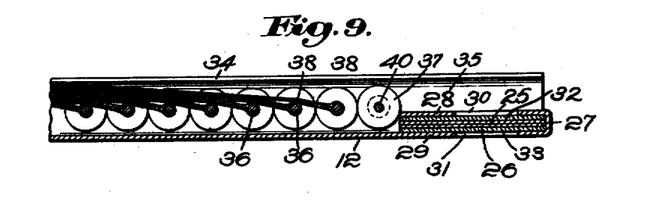
Fig. 9 is a sectional view on an enlarged scale on line 9—9 of Fig. 7.

Referring now to Fig. 9, the index is provided with two identification labels 25 and 26, facing in opposite directions and mounted in a suitable label-holder 27, the latter having two opposite walls 28 and 29, provided with apertures 30 and 31, respectively, through which the labels may be viewed. The label-holder may be, and is herein, formed as an integral part of the index element 12, which is preferably formed of thin sheet metal, the margin of which may be perforated to form the apertures 30 and 31, and bent upon itself to form a pocket closed at the outer margin and having an entrance at the inner, into which pocket the labels 25 and 26 are inserted. If desired, these labels may be, and they are herein, formed of a single sheet of paper folded upon itself and bearing two like identifications on one face of the sheet. The identifications may be applied very conveniently by writing the entire series of identifications in pairs on a single strip of paper in a typewriter, and the strip may be scored at the points where it is desired to separate it, and also along the folding lines. Each pair of labels when thus produced forms a single piece which may be folded and then inserted in the pocket provided therefor between the walls 28 and 29. If desired, the faces of the labels may be protected by suitable protectors, herein sheets 32 and 33 of celluloid covering the faces.

Figure 10:
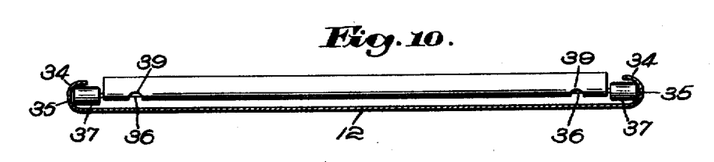
Fig. 10 is a sectional view on line 10—10 of Fig. 7.

The main leaves may be equipped with auxiliary leaves or record sheets of any suitable character mounted on or in the main leaves in any appropriate manner, but in the present embodiment of my invention, I have provided said main leaves with pairs of inwardly turned marginal flanges 34 (see Figs. 10 and 11) forming channels 35 to receive suitable auxiliary leaf or sheet holders. In the present example, the latter are in the form of flexible rods or wires 36, having enlarged terminal portions 37 preferably of generally cylindrical form, constituting trunnions and spacing devices for said rods whereby the latter can be turned about their axes, but are held in properly spaced relation with one another in their channels, as clearly shown in Fig. 9. Suitable overlapping leaves or sheets 38 may be attached to the rods 36, as by providing said sheets with perforations 39, through which the rods are threaded and thus interlocked with the sheets, and the latter may be and are herein folded upon themselves with each rod disposed within the fold of its respective sheet.

Figure 7:
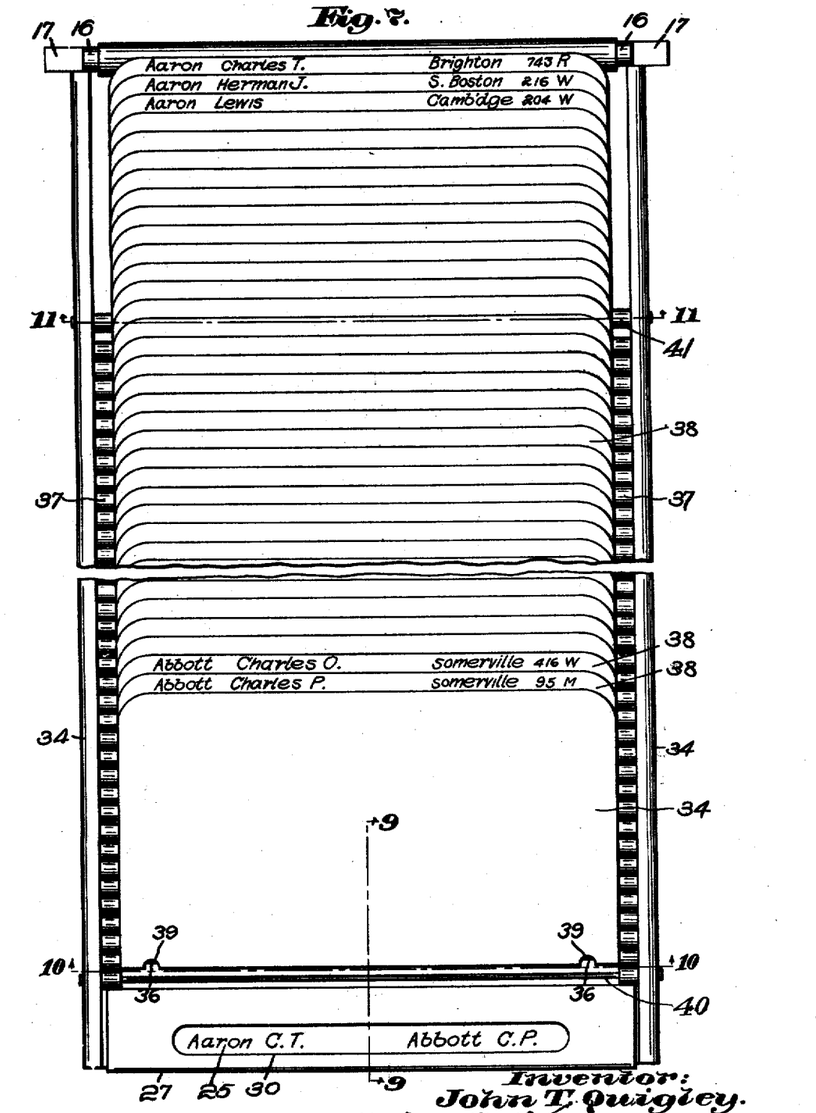
Fig. 7 is a detail plan on an enlarged scale of one of the main leaves or frames, with the sheets or cards therein.
Figure 8:
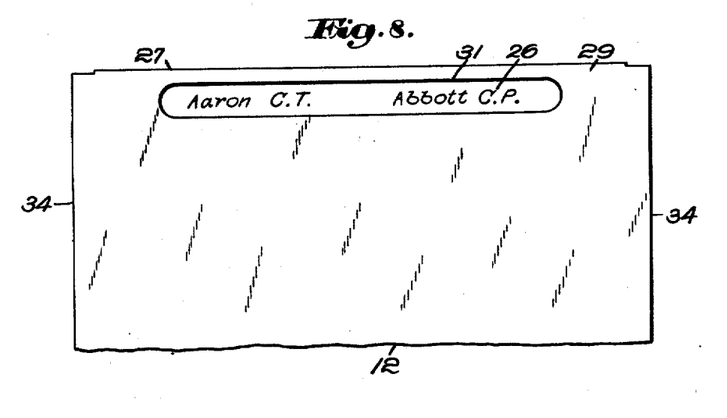
Fig. 8 is a rear elevation plan of a portion of the main leaf showing the opposite face.

Thus each sheet presents two leaves either face of which is available for records. In Fig. 7, the intermediate portion of the rod is received within the fold of the sheet and it extends thence through the perforations and behind both thicknesses of the sheet, so that it is hidden thereby. It will be observed by reference to Fig. 7 that the overlapping margins of the leaves are provided with index identifications, and moreover that said margins are directed toward the hinges of the main leaves when the latter are horizontally disposed. Furthermore, the auxiliary leaves are on the upper faces of the main leaves. Since the rods are flexible, they may be sprung into and out of place by flexing them to reduce their lengths, thereby to withdraw their ends from the channels in which they are normally held.

Figure 11:
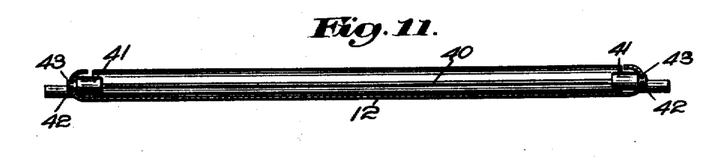
Fig. 11 is a sectional view on line 11—11 of Fig. 7, but with the sheets omitted.

As a means to hold the entire body of rods against undue longitudinal displacement, I have herein provided a pair of stops in the form of rods 40, having enlarged terminal portions 41 provided with reduced ends 42 fitted into lateral perforations 43 provided in the flanges 34, as clearly shown in Fig. 11. These rods, like the others, may be easily removed and replaced by flexing them to reduce their lengths, thereby to withdraw them from the perforations in which they are normally disposed. Any desired number of perforations 43 may be provided at appropriately spaced intervals along the flanges 34, thereby to accommodate many or few cards or auxiliary leaves, according to the requirements, and in Figs. 1 and 3, I have shown three such sets of perforations adjacent to one set of ends of the main leaves, and a single set of perforations adjacent the other ends. The latter are intended to receive stop rods 40 placed closely adjacent the labels, and serving to hold the latter in place in their pockets.

It should be observed that the auxiliary leaves or sheets like the main leaves are arranged in overlapping relationship, and their index-bearing, overlapping margins are all presented to view at one time, so that by opening the index at the proper point, the desired auxiliary leaf or sheet is instantly available by simply scanning the identifications. When the desired auxiliary sheet or leaf of one group has been found, and the user wishes to find an auxiliary leaf or sheet of another group, it is unnecessary to restore the main leaves or any of them to an initial position because the index identifications thereon can be read from both sides, hence the second auxiliary leaf or sheet can be reached by a single movement or operation from the first, and so on.

An important feature of my invention is the relative arrangement of the main and auxiliary leaves, it being such that they are presented in the most natural and convenient relationship for rapid reference and recording. Since the overlapping indexed margins of the auxiliary leaves or sheets are parallel with the overlapping indexed margins of the main leaves, the identifications can be read and records can be made with great ease and rapidity, speed being an important consideration in an equipment of this class. For the same reason, the overlapping main leaves press the auxiliary leaves down flat and keep them in good condition. By having the overlapping indexed margins of the auxiliary leaves extend away from the user when in a horizontal position, the identifications can be applied to the upper margin of a sheet by means of a typewriter without any special attachment such as is required when applying the identifications to the lower margins of sheets. For the same reason, the auxiliary leaves are presented in the most convenient position to open them at the desired point, because it is most natural and convenient to reach for the edge of a sheet and to swing it toward the user in order to expose the record surface of the underlying leaf for inspection and recording purposes. Since the overlapping edges of the auxiliary leaves are directed toward the hinges of the main leaves, it follows that the action of gravity will tend to restore the overlapping margins of the auxiliary leaves to their proper positions when the main leaves are turned to their upstanding positions because the auxiliary leaves will then be in depending positions. It should here be observed that in this relative position of the main and auxiliary leaves, the latter are interposed between the face of one main leaf and the back of the next adjacent upstanding main leaf. On the other hand, when a main leaf is turned to its horizontal position, the auxiliary leaves thereon are presented on its upper side and records can be made without removal of either main or auxiliary leaves from their places.

Figure 3:
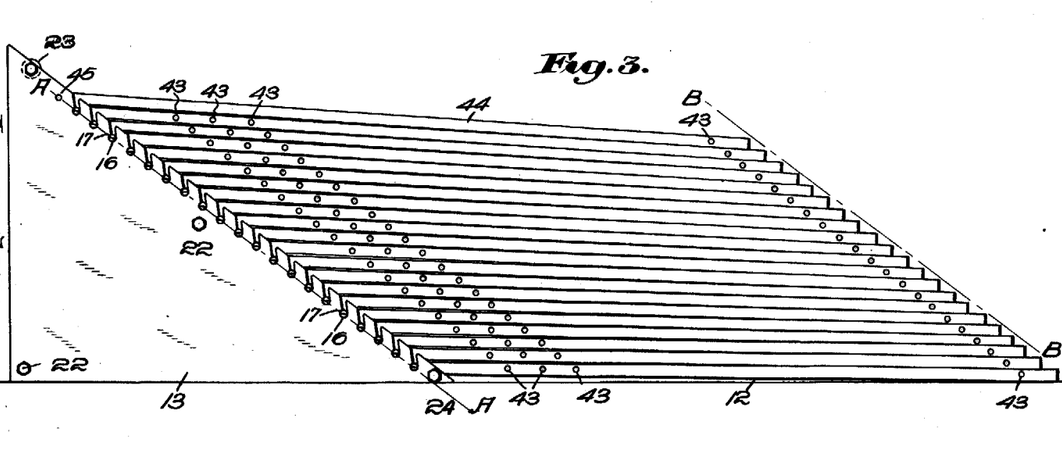
Fig. 3 is a side elevation of the equipment in the position shown in Fig. 2.
Figures 4, 6:
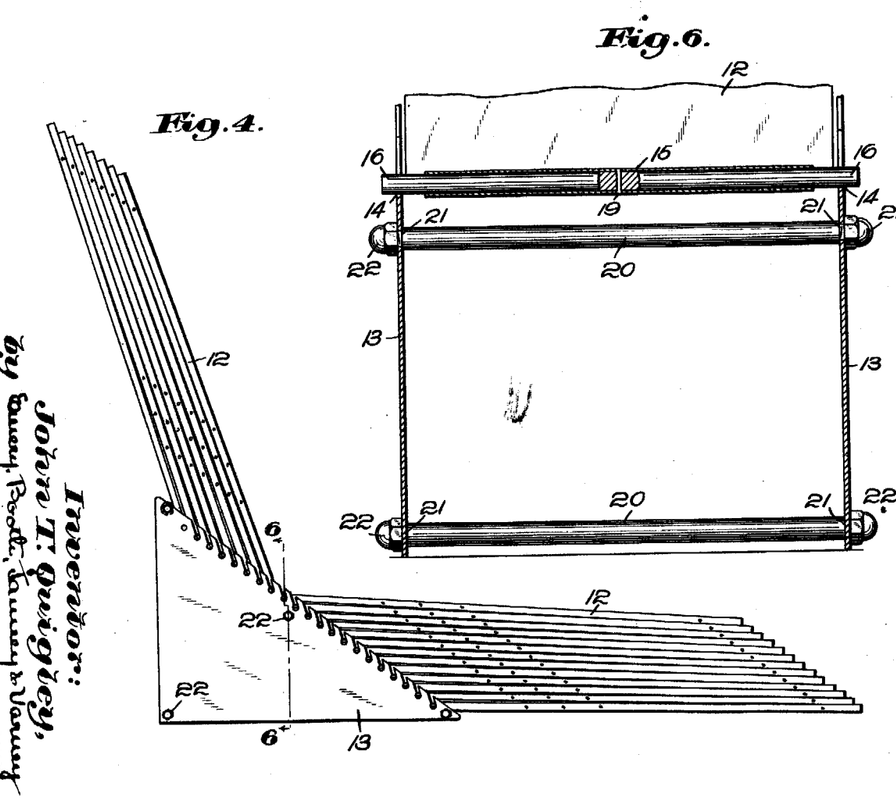
Fig. 4 is a side elevation of the equipment at a reduced scale, showing some of the main leaves upstanding and others prone.
Fig. 6 is a sectional view on an enlarged scale on line 6—6 of Fig. 4.
Figure 5:
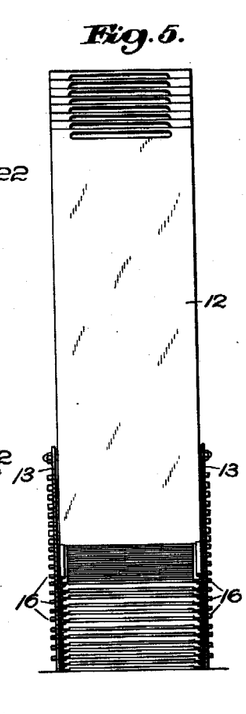
Fig. 5 is a front elevation of the equipment in the position shown in Fig. 4.

It is desirable to provide means to cover the cards of the highest main leaf; that is to say, the one which is uppermost when prone as in Fig. 3, and at the left when upstanding as in Fig. 1. To this end, I have provided another hinged main leaf 44, similar in a general way to the main leaves 12, and pivoted on the shaft 45 mounted in the walls 13, but preferably in a closed bearing and not removable therefrom. If desired, this leaf 44 may be provided with identification labels like those hereinbefore described, and held in place by like means, such labels however, serving to identify the whole index equipment as a unit.

When the latter is closed in either of the positions shown in Figs. 1 and 3, the overlying main leaves protect the auxiliary leaves or sheets and press the latter down flat, thus keeping them in good condition. If the auxiliary leaves or sheets become somewhat bent or curled in use, the weight of the overlapping main leaves will tend to flatten and keep them in shape.

Having thus described one embodiment of my invention what I claim and desire by Letters Patent to secure is:

1. A filing and indexing equipment comprising, in combination, a plurality of overlapping sheet-supports pivoted to swing about parallel axes, and a plurality of series of overlapping sheets, one series being carried by each sheet-support, each series being secured to its respective sheet-support along the margins of such sheets parallel with said axes, and being free along their overlapping margins.

2. A filing and indexing equipment comprising, in combination, a plurality of overlapping sheet-supports pivoted to swing about horizontal axes from a generally horizontal position to a generally upstanding position, and a plurality of series of overlapping sheets, one series being carried by each sheet-support on the face of the latter which is uppermost when such sheet-support is horizontally disposed.

3. A filing and indexing equipment comprising, in combination, a plurality of overlapping sheet-supports pivoted to swing about horizontal axes from a generally horizontal position to a generally upstanding position, and a plurality of series of overlapping sheets, one series being carried by each sheet-support on the face of the latter which is uppermost when such sheet-support is horizontally disposed, each series of sheets being secured to its respective sheet-support along the margins of such sheets parallel with said axes.

4. A filing and indexing equipment comprising, in combination, a plurality of overlapping sheet-supports pivoted to swing about parallel axes, and a plurality of series of overlapping sheets, one series being carried by each sheet-support, each series being secured to its respective sheet-support and having their overlapping margins parallel with said axes and free along their entire edges.

5. A filing and indexing equipment comprising, in combination, a plurality of overlapping sheet-supports pivoted to swing about parallel axes, and a plurality of series of overlapping sheets, one series being carried by each sheet-support, each series having its overlapping margins directed toward the axis of its support.

6. A filing and indexing equipment comprising, in combination, a plurality of overlapping sheet-supports pivoted to swing about parallel axes, and a plurality of series of overlapping sheets, one series being carried by each sheet-support, each series being secured to its respective sheet-support along the margins of such sheets parallel with said axes, and being free along their overlapping margins, each series having its overlapping margins directed toward the axis of its support.

7. A filing and indexing equipment comprising, in combination, a plurality of overlapping sheet-supports pivoted to swing about horizontal axes from a generally horizontal position to a generally upstanding position, and a plurality of series of overlapping sheets, one series being carried by each sheet-support on the face of the latter which is uppermost when such sheet-support is horizontally disposed, each series having its overlapping margins directed toward the axis of its support.

8. A filing and indexing equipment comprising, in combination, a plurality of overlapping hinged leaves, and a plurality of groups of overlapping hinged leaves, one group being carried by each of the first-mentioned leaves, the hinges of all of said leaves being substantially parallel.

9. A filing and indexing equipment comprising, in combination, a plurality of overlapping hinged leaves provided with guides transverse to their hinges, and a plurality of groups of overlapping hinged leaves guided by said guides, one group being carried by each of the first-mentioned leaves, the hinges of all of said leaves being substantially parallel.

10. A filing and indexing equipment comprising, in combination, a plurality of hinged leaves having overlapping margins, and a plurality of groups of hinged leaves having overlapping margins, one group being carried by each of the first-mentioned leaves, the hinges of all of said leaves being substantially parallel.

11. A filing and indexing equipment comprising, in combination, a plurality of hinged leaves having overlapping margins, and a plurality of groups of hinged leaves having overlapping margins, one group being carried by each of the first-mentioned leaves, the hinges of all of said leaves being substantially parallel and the overlapping margins of said leaves being indexed.

12. A filing and indexing equipment comprising, in combination, a plurality of hinged leaves having overlapping margins, and a plurality of groups of hinged leaves having overlapping margins, one group being carried by each of the first-mentioned leaves, the hinges of all of said leaves being substantially parallel and the overlapping margins of said leaves being provided with indexes readable right-side up from one point.

13. A filing and indexing equipment comprising, in combination, a plurality of hinged leaves having overlapping margins, and a plurality of groups of hinged leaves having overlapping margins, one group being carried by each of the first-mentioned leaves, the hinges of all of said leaves being substantially parallel and the overlapping margins of said leaves being provided with indexes arranged parallel with said hinges.

14. A filing and indexing equipment comprising, in combination, a plurality of hinged leaves whose margins opposite the hinges are arranged in overlapping relationship, and a plurality of series of hinged leaves carried by the first-mentioned leaves and whose margins opposite the hinges are arranged in overlapping relationship and point in a direction opposite to the overlapping margins of the first-mentioned leaves.

15. A filing and indexing equipment comprising, in combination, a plurality of horizontally hinged leaves whose margins opposite the hinges are arranged in overlapping relationship, a mounting on which said leaves may be swung from an upstanding position to a prone position, and a plurality of series of hinged leaves carried by the first-mentioned leaves and whose margins opposite the hinges are arranged in overlapping relationship and depend from their hinges when the first-mentioned leaves are upstanding from their hinges.

16. A filing and indexing equipment comprising, in combination, a plurality of hinged leaves, and a plurality of series of hinged leaves carried by the first-mentioned leaves and whose edges opposite their hinges normally point toward the hinges of the first-mentioned leaves.

17. An index equipment comprising, in combination, a support presenting a plurality of bearings, and a plurality of index elements removably and hingedly supported by said bearings and adapted to swing from a generally horizontal position to a generally vertical position, said support and said index elements having means interlocking to prevent removal of said index elements except in a generally upright position.

18. An index equipment comprising, in combination, a support presenting a plurality of bearings, and a plurality of index elements removably and hingedly supported by said bearings and adapted to swing from a generally horizontal position to a generally vertical position, said index elements being provided with trunnions interlocked with said support to prevent removal therefrom except when said index elements are disposed in generally upright positions.

19. An index equipment comprising, in combination, a support presenting a plurality of bearings, and a plurality of index elements removably and hingedly supported by said bearings, and adapted to swing from a generally horizontal position to a generally vertical position, said index elements having trunnions interlocked with said support to prevent removal therefrom and having provision to unlock therefrom by swinging said trunnions to predetermined positions.

20. An index equipment comprising, in combination, a support notched to provide a plurality of bearings arranged in a series inclined to horizontal and vertical planes, and a plurality of removable overlapping index elements having generally horizontal laterally projecting trunnions mounted to turn in said bearings, and provided with means having interlocking connection with said bearings.

21. An index equipment comprising, in combination, a plurality of overlapping index elements pivoted to swing about generally parallel axes, the overlapping marginal portions of said elements being bent to provide label-holders each having two generally parallel apertured walls forming between them a label-receiving chamber, and means providing two oppositely facing identification labels received in said chamber and exposed to view through said apertures.

22. An index equipment comprising in combination, a plurality of overlapping index elements pivoted to swing about generally parallel axes, the overlapping marginal portions of said elements being provided with label-holders on opposite sides thereof and closed at their outer marginal edges and having entrances adjacent their inner edges, means providing two oppositely facing identification labels receiving in each label-holder, and means normally to prevent accidental escape of said labels from said entrances of said label-holders.

23. An index equipment comprising in combination, a plurality of overlapping index elements pivoted to swing about generally parallel axes, the overlapping marginal portions of said elements being bent to form channel-shaped label-holders each having two generally parallel apertured walls forming between them a label-receiving channel having a label-introducing entrance, means providing two oppositely facing identification labels received in said channel and exposed to view through said apertures, and means normally blocking said entrance to said channel thereby to prevent accidental escape of said labels from said label holders.

24. An index equipment comprising, in combination, a plurality of sheet-carriers pivoted to swing about generally parallel axes and having overlapping marginal portions generally parallel with said axes, and a plurality of series of sheets pivotally mounted on said sheet-carriers to swing about axes generally parallel with the axes of said sheet-carriers and having overlapping marginal portions generally parallel with the overlapping marginal portions of said sheet-carriers.

In testimony whereof, I have signed my name to this specification.

JOHN T. QUIGLEY.